United States Patent Office.

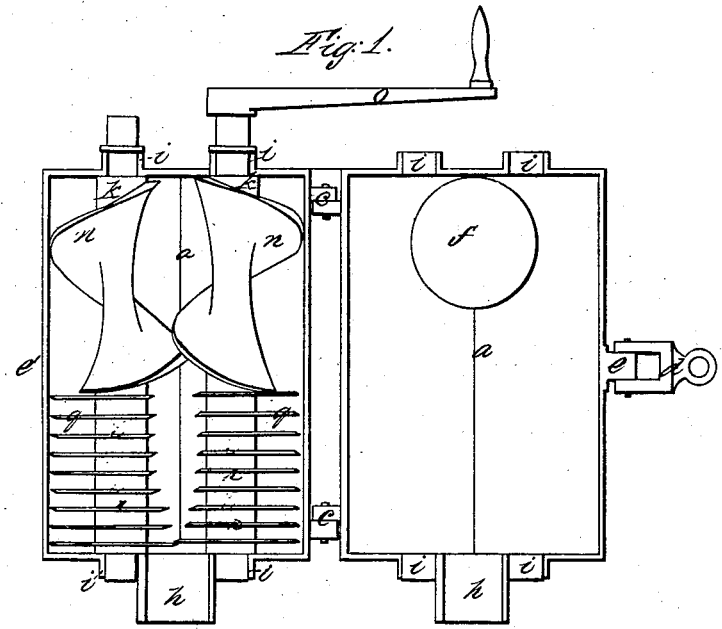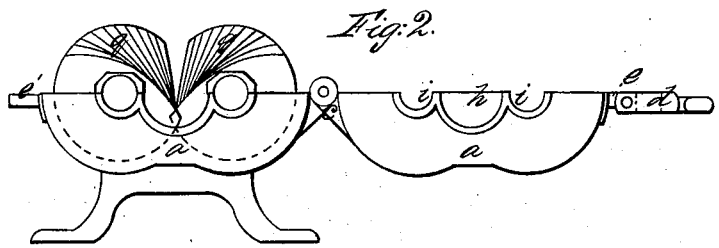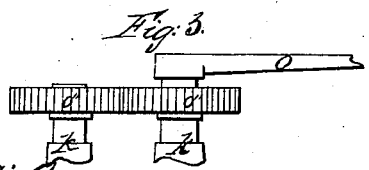

ALFONZO J. EDDY, OF NEW BRITAIN, CONNECTICUT.

Letters Patent No. 77,014, dated April 21, 1868.

IMPROVED MEAT-CUTTER.

*The Schedule referred to in these Letters Patent and making part of the same.*

TO ALL WHOM IT MAY CONCERN:

Be it known that I, ALFONZO J. EDDY, of New Britain, county of Hartford, and State of Connecticut, have invented certain new and useful Improvements in Meat-Cutters; and to enable others skilled in the art to make and use the same, I will proceed to describe its construction and operation, by referring to the drawings, in which the same letters indicate like parts in each of the figures.

The nature of this invention will be understood from the specifications and drawings, The object of which is to simplify and cheapen the manufacture, and produce a more efficient and durable article for use and trade.

In the accompanying drawings—

Figure 1 is a top view, with the cover or one-half of the shell thrown over, showing the inside of each half, with the mechanism arranged therein.

Figure 2 is an end view of the same.

Figure 3 is a view of a portion of the cutter-shafts, having gears thereon, which are proposed being used when desirable.

$a$ is the shell, having a plain, smooth surface inside and out, each half being secured together by hinges, $c$, in the ordinary way.

$d$ is a clasp, pivoted to a stub, $e$, so that when the two parts are closed together, the open portion of said clasp will grasp closely over a corresponding stub, $e'$, upon the other half of the shell, thus holding the two parts of the shell firmly together.

$f$ is a funnel formed on the upper side, and near the end of the case.

$h$ is a discharge-tube formed on the opposite end of the shell from the feed-funnel.

$i$ are bearings or boxes for the feed and cutter-shafts. One-half of each of their diameters is formed in each half of the case.

$k$ are feed and cutter-shafts, which take their bearings in boxes $i$.

$n$ are spiral feed-gears formed on the said shafts, so that, by turning the crank $o$, the spiral gear $n$ will act upon and drive the spiral gear $n'$ without the aid of the gears $o''$, which I propose to use sometimes, particularly on large-size machines.

$q$ are cutters, the eye of which is or may be made round, having two straight sides, or octagon shape, so as to fit a shaft of corresponding shape, so that, while the cutters may all be made of one shape, they may be arranged upon the shafts, the edge of one a little in advance of the other, by changing the position upon said shafts, which will produce the spiral arrangement of their cutting-edges, more or less, as shown in fig. 2.

$r$ are washers, which are placed between the cutters, to secure them in a given or desired distance apart, and relative to those on the opposite shaft. Now, it will be seen that, by this improvement, I secure a case of smooth surface upon the inside, to avoid resistance to the action of the feed or cutters, thereby allowing the machine to work more easily and freely, and allow it to be perfectly and easily cleaned without any obstruction.

I believe I have thus shown the nature, construction, and advantage of this invention, so as to enable others skilled in the art to use the same therefrom.

I claim the shape and spiral arrangement of the shear-cutters $q$, arranged interchangeably upon the shafts $k$, in combination with the feeders $n\ n$, arranged within a smooth inner-surface case, with the gears $o''$, substantially as and for the purpose described.

ALFONZO J. EDDY.

Witnesses:
N. C. WILDER,
J. W. BLISS.